Dec. 13, 1949         F. G. HENRY ET AL         2,491,312
METHOD AND APPARATUS FOR OPHTHALMIC MEASUREMENTS
Filed July 20, 1948                 2 Sheets-Sheet 1

INVENTORS
Ferdinand G. Henry
George W. Stark
BY
ATTORNEYS.

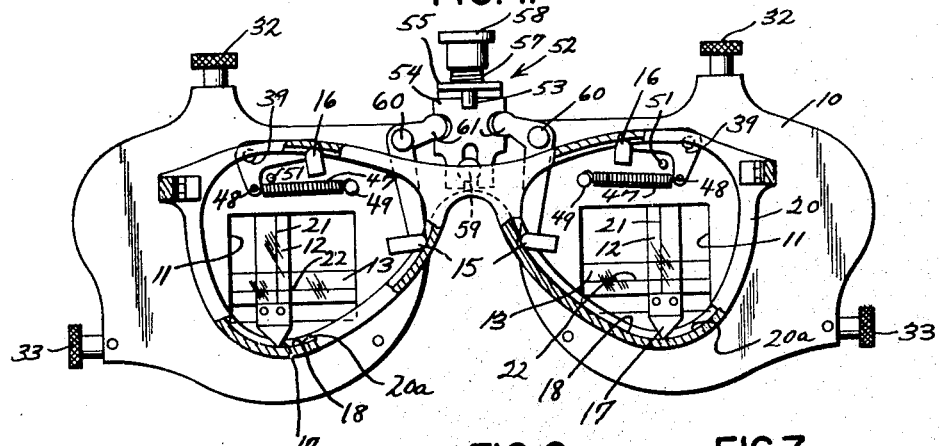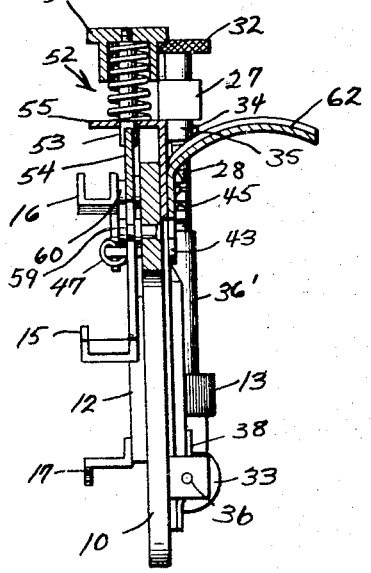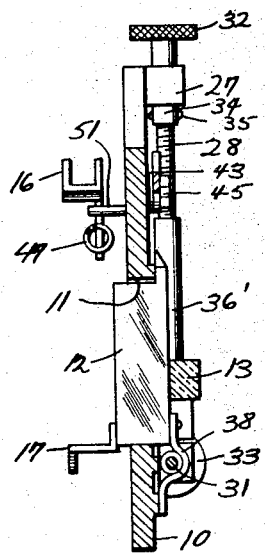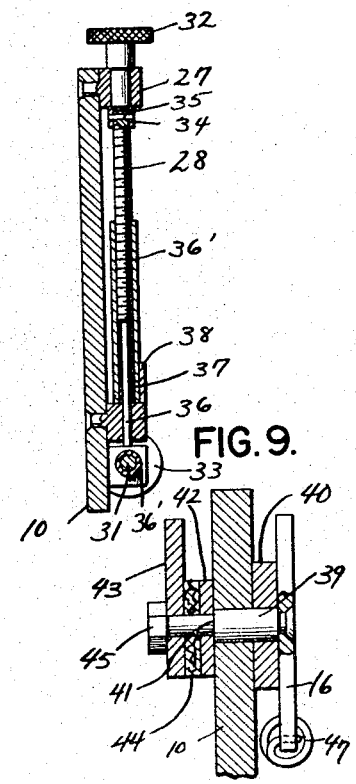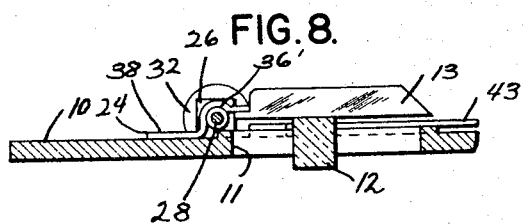

Patented Dec. 13, 1949

2,491,312

UNITED STATES PATENT OFFICE 2,491,312

METHOD AND APPARATUS FOR OPHTHALMIC MEASUREMENTS

Ferdinand G. Henry, Jersey City, and George W. Stark, Bergenfield, N. J.

Application July 20, 1948, Serial No. 39,694

15 Claims. (Cl. 33—200)

This invention relates to improved method and apparatus for ophthalmic measurements, and particularly to the making of such measurements as applied directly to frames selected by the patient so that bifocal lenses may be accurately fitted to the frames as the primary object of the invention.

The fitting of lenses to various types of frames, that is frames of various popular shapes as are now available has presented an involved problem of properly positioning bifocal lenses in such frames. The present invention provides for properly centering the lenses in such frames with respect to the face of the patient, adjusting indices in the making of measurements without disturbing the alignment and balance of the instrument without parallax, neutralizing the instrument after taking horizontal measurements, and other details as will appear hereinafter.

Accordingly another object of this invention is to provide such an instrument which will fit within the lens groove also known as an eye wire groove of the frame selected for the patient so that the measurements can be made directly with respect thereto without transferring outside errors to the lenses to be mounted in such grooves.

An important object of this invention is to provide improved and accurate means for determining the pupillary distance, or P. D. in the fitting of eyeglasses or spectacles, directly through and in combination with the spectacle frame while the latter is in actual wearing position.

A further object is to provide improved and accurate means for determining the pupil height, directly through and in combination with the spectacle frame while worn by the patient.

A further object is to provide improved and accurate means for determining the height directly and in combination with the spectacle frame while the latter is in actual position on the patient.

Still a further object is to provide improved and accurate means for determining any existent defects or imperfections in facial symmetry, directly through and in combination with said frame while the latter is in actual wearing position.

Another object is to provide means for automatically bringing the measuring device into alignment with the center of the bridge of the spectacle frame.

Therefore the particular object of this invention, is to provide means for determining accurately all necessary optical measurements directly through and in combination with the actual spectacle frame which is to be used by the patient and do so while said frame is in wearing position on the patient.

Further objects, details and advantages of our invention will appear in the following specification supplemented by the accompanying drawings forming a part thereof and illustrating a highly satisfactory embodiment employing principles of our invention.

In the drawings:

Fig. 4 is a rear elevation view of the instrument applied to a frame of a different shape.

Fig. 5 is a vertical sectional view taken on the line 5—5 of Fig. 2.

Fig. 6 is a vertical sectional view taken on the line 6—6 of Fig. 2.

Fig. 7 is a vertical sectional view taken on the line 7—7 of Fig. 2.

Fig. 8 is a horizontal sectional view taken on the line 8—8 of Fig. 2.

Fig. 9 is an enlarged vertical sectional view taken on the line 9—9 of Fig. 2.

Figure 1:
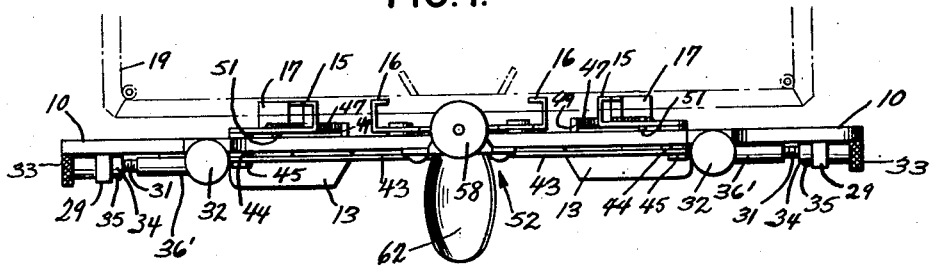
Fig. 1 is a plan view of an ophthalmic measuring instrument applied to an eyeglass frame in accordance with our invention.

The optician, refractionist, and fitter of eyeglasses and spectacles has long been in need of a scientifically accurate optical instrument which would enable him to arrive at the accurate measurement absolutely necessary in the proper fitting and grinding of bifocal and multifocal lenses.

It is a well known fact that upon the proper placement of the bifocal segment in the finished glasses, depends the success or failure of these glasses as bifocals.

While it has been a crude although relatively simple matter to arrive at the proper segment height in the use of rimless glasses by placing a glazed rimless sample having lenses of proper size and shape and correct bridge measurement on the patient and placing an ink or crayon horizontal mark on each lens and measuring from the mark to the bottom of the lenses thus arriving at the segment height after a fashion, with metal or plastic frame it is another matter.

The vast majority of spectacles in use today are of the metal or plastic frame type and, therefore, bifocal and multifocal measurements in the use of such frames has been left in a large measure to guess work and this cannot be tolerated in the exact science of optics.

In the case of metal frames with adjustable guards, an error in judgment as to the segment height can be compensated for by either raising or lowering the guards. However, with frames having no adjustable guards and plastic frames in particular, it is practically impossible to have all the different shapes and sizes of frames in the glazed form, and the most troublesome to the fitter of bifocal lenses to frames with fixed bridges and immovable pads, is the fact that a frame of a definite eye size and bridge width will rest either higher or lower on one patient than on another patient requiring that identical frame.

It is also true that, while two patients may require the same and identical frame, the same two patients may have a different pupillary distance, or P. D. Also because no two persons have identical facial characteristics, especially in nose construction and disposition, and because no two frames are exactly duplicates and are subject to many variations, and also because the frame, when in place on the patient, does not occupy exactly the same position in relation to the eyes the measuring device occupied while taking measurements, it follows that, in transfer from measurements to lenses and from lenses to frame, the point located and generated on the lens will not, after the lens is mounted in the frame, correspond accurately with the original measurements taken by the fitter and misalignment will result however accurate the original measurements might have been and this will result in pupillary distance, pupil height, segment height and other errors which, in the case of frames without adjustable guards, as in plastic frames, cannot be corrected.

It is therefore obvious that, to expect absolutely correct results, the original prescriptive dimensions must be taken through and in combination with the frame itself while said frame is in the correct position on the patient, because only then will the final result be as prescribed.

According to the present invention the ophthalmic measuring instrument which will now be described is an instrument which will accomplish the desired results. This optical instrument will actually permit all measurements to be taken through and in combination with the very frame the patient is to use and is designed to do this while the patient is wearing the frame.

Figure 3:
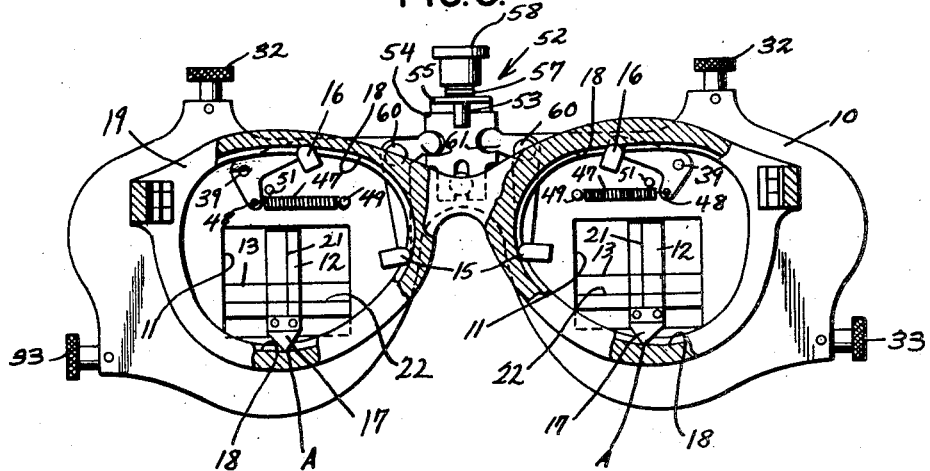
Fig. 3 is a rear elevation view thereof, the selected eyeglass frame being shown partly in vertical section to illustrate the manner of application of the instrument thereto.

Referring to the drawings, in general the opthalmic instrument includes a mask 10 comprising a base plate with a pair of rectangular sight opening windows 11 therein and carrying adjustable vertical and horizontal indices 12 and 13 with mounting or feeler fingers 15, 16 and 17 for engaging the lens grooves 18 in each lens opening of any type of eyeglass frame, such as 19 as shown in Figs. 1 and 3 or 20 as shown in Fig. 4. Frames 19 and 20 are examples illustrating variations in shape and size for showing the adaptability of the instrument, the eyeglass frames themselves otherwise constituting no part of the invention. Thus feeler fingers 15, 16 and 17 are necessarily adjustable for fitting the lens grooves 18 of the different sized and shaped frames as well as for performing other functions to be pointed out.

The vertical and horizontal indices 12 and 13 each comprise elongated bars of transparent material such as glass or plastic overlying each other in vertical planes parallel with each other and with respect to the base plate or mask 10 and in the area of the sight openings 11. These vertical and horizontal indices have parallel front and back faces each with a pair of overlying parallel vertical and horizontal hair lines 21 and 22 respectively on said opposite faces. These parallel lines are preferably drawn in bright colors, as red, to contrast with the black pupils of the eyes, and being spaced by a desired thickness of the bars they eliminate errors due to parallax.

Thus with the mask in place an optician may independently move the vertical indices 12 to correspond with the pupillary distance and positions thereof may be determined with respect to the eyeglass frame selected by readings on scales 23 above each of the sight openings 11 on the mask 10 with which the hair lines 21 cooperate. Height measurements as will be more fully described are made by independent movements of the horizontal indices 13 and the corresponding position readings are determined by index pointers 24 and the scales 25 with which they cooperate at the sides of each of the sight openings 11 on the mask 10.

In order to adjustably move indices 12 and 13 the mask 10 is provided with vertically disposed bearing members 26 and 27 for vertical adjusting screws 28 and similar horizontally disposed bearing members 29 and 30 for horizontal adjusting screws 31. The outer free end of each of these screws is provided with knurled manipulating heads 32 and 33, for the respective vertical and horizontal screws, and their longitudinal movement of these screws is prevented by collars 34 secured to them by pins 35 in cooperation with the knurled heads 32 and 33 engaging opposite sides of the respective bearings 26 and 29.

The inner ends 36 of screws 28 and 31 are of a reduced diameter and cylindrical, as best shown in Fig. 7, and longitudinal internally threaded tubular members 36' are mounted thereon, being of such a length as to move the limit of scales 23 and 25 between the corresponding bearings 26 and 27, and 29 and 30 respectively. Each of said tubular members is threaded for a short distance beyond which its internal diameter is made slightly larger than the outside diameter of the thread of the screw. In the end of and in the unthreaded portion there is a bushing 37 fixed in said sleeve portion and free to slide on the reduced portion 36 for a portion of its length. Thus two points of bearing have been provided for the sleeve, one end fitting over the screw and one in the bearing bushing 37 at the other end of the sleeve over the reduced diameter.

The indices 13 are secured to bracket 38, which are in turn fixed to the vertical tubular sleeves 36'. Thus, when screws 28 are turned sleeves 36' together with indices 13 and pointers 24 will move vertically. This vertical movement is measured in millimeters on scales 25. When the horizontal screws 31 are turned by knobs 33, indices 12 which are similarly mounted on the corresponding horizontal tubular sleeves 36' will in turn move horizontally, this horizontal movement being measured in millimeters on scales 23.

On the back side of this instrument and integrally attached to each index 12 (Figs. 3, 4, and 6) is the pointed finger or "feeler" 17 for engaging the bottom of the lens groove 18 in the frame 19 or 20 as shown in Figs. 3 and 4.

On the back of mask 10 Fig. 3, fingers 16 are each rigidly fixed on shafts 39, (Figs. 6 and 9) pivotally mounted in mask 10, spacer 40 preventing finger 16 from contacting mask 10. Abutting against shoulder 41, on shaft 39 is a spacer 42 and between it and a pointer 43 is a felt washer 44. A nut 45 on end of shaft 39 provides for sufficient pressure between felt washer 44 and pointer to cause pointer 43 to turn with the shaft when no outside resistence is applied to the pointer, but, because of the felt washer friction being slight, pointer 43 can be turned relative to shaft 39 manually and set to the O mark 46 on mask 10.

Fingers 16 are adapted to engage the top lens groove 18 in the spectacle frame 19 or 20 as stated. They are also provided with a spring 47 attached at 48 and to pins 49. Stop pins 51 are provided to prevent over travel of fingers 16.

Figure 2:
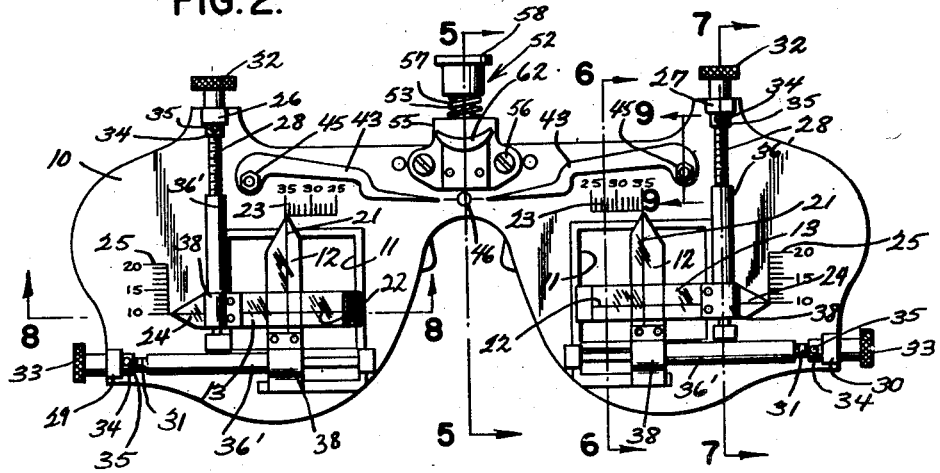
Fig. 2 is a front elevation view of the instrument.

A centering device 52 located at the center of the instrument, which is also the center of the nose piece or bridge of the spectacle frame and is also the exact center between the two lenses, comprises a plunger 53 and toggle plate 54 slidably mounted in bracket 55, fixed to mask 10 by screw 56. Toggle plate 54 is normally yieldably held in its uppermost position as shown in Fig. 2 by spring 57 abutting between button 58 and bracket 55, a flat headed pin 59 keeping the plunger and toggle plate in correct alignment with the vertical center line. Fingers 15 are pivoted on pin 60 fixed in mask 10 and are provided with arms 61 adapted to engage toggle plate 54 so that when button 58 is depressed both fingers 15 will swing outwardly and upon release they will return to engage the lens groove 18 in the frame 19 or 20 on both sides of the bridge of the spectacle frame, as shown in Figs. 3 and 4. Thus with this device, the frame and instrument must come to rest at a common center.

In this manner the instrument and frame are held together in their proper relation and since all of the gripping fingers 15, 16 and 17 are in contact with and in the lens groove, all measurements now taken must be exactly correct with respect to the lenses which are later to be mounted in said grooves irrespective of any external deformity of the frame itself. Thus, the measurements have been correctly transferred to the lenses direct as though the lenses themselves had been in the frame at the time these measurements were taken. A finger grip 62 attached to the central upper portion of the mask 10 is provided for convenience in handling.

In operation two open windows 11 (Figs. 2, 3 and 4) in mask 10 provide an unobstructed view of the patient's eyes through the clear transparent indices 12 and 13, used in exploring the eyes and taking measurements.

Turning thumb knobs 33, hence, screws 31, moves vertical indices 12 in horizontal directions, the amount of said movement being read in millimeters on upper metric scales 23.

Turning thumb knobs 32, hence, screws 38, moves horizontal indices 13 in the vertical plane the amount of said movement is read in millimeters on lower metric scales 25.

The upper metric scales 23 are used to determine the pupillary distance or P. D. and facial center. The lower or side metric scales 28 are used to determine bifocal segment height, pupil height and any existent defects or imperfection in facial symmetry.

Depressing button 58, on centering device 52, spreads apart fingers 15 and after inserting frame 19 or 20 between them and releasing button 58, these fingers will close in on the frame centering it accurately with the center of the instrument.

When the final decision has been reached as to the type of frame, and after due consideration has been given to proper eye size, bridge size, bridge type, general optical fitting qualities as well as cosmetic effect, the following procedure may be followed.

Grip the mask 10 with the index finger of the right hand under the finger grip 62 and the thumb over the center button 58. Press down on the button thus spreading the centering fingers 15 to their limit. Insert the bridge of the frame between the fingers, one finger in each lens space.

Engage upper fingers 16, each in its respective lens groove, press the whole frame downward and hook the lower feelers 17, each in its respective lens groove. Release the centering knob 58, and make sure that both centering fingers are engaged in their respective lens grooves. It is extremely important that each of these fingers be in its respective lens groove in order that the instrument will center properly.

The combination is now ready for use. If now the frame carrying the instrument is placed on the patient, both the frame and instrument will occupy corresponding proper positions in relation to the patient's eyes. Obviously, any measurements taken under this condition will result in the correct duplication of measurements in the process of transferring to the lenses and finally to the frame.

In use the frame with the instrument attached as above set forth is placed on the patient, being careful that no horizontal unbalance of the frame itself is present. In measuring the pupillary distances of both eyes, the measurements are obtained by moving the vertical transparent indices 12 either to the right or left until their respective hair lines 21 bisects the respective pupils. The measurement for each eye, from the center of the bridge, can be read in millimeters directly from each scale 23 above the windows 11. Once the P. D. is obtained and recorded the vertical indices are of no further use. However, they carry with them the fingers 17 or feelers which locate the vertical scales 25 with respect to the lowest point of the lenses. Therefore they must be neutralized or returned to the lowest point in the lens groove.

Since all the parts are mounted on mask 10 therefore when mask 10 is moved with respect to the spectacle frame 49 or 20 everything mounted on the mask moves along with it also with respect to the spectacle frame.

The spectacle frame 19 or 20 is yieldably mounted on the mask 10 between fingers 15, 16 and 17, therefore the spectacle frame can move reely or float along vertical lines. One finger 7 carried by vertical index 12 is fixed in relation to the vertical but is movable in the horizontal direction. Finger 16 is yieldably mounted so that the spectacle frame can and will move down when point 17 of index 12 is brought in engagement with the curvature 20ª for example of frame 20 pulling finger 16 down with it; this in turn swings pointer 43 down below point O. Obviously when point 17 is on neutral, or the lowermost position of the lens groove, there will be no motion of pointer 43, indicating complete neutralization of the instrument.

This neutralization of the instrument is necessary because all vertical measurements are reckoned from the lowest point of the lens as the conventional point of reference.

The scale 25 indicating the vertical position of index 13 is graduated in relation to the lowest part of the lens—in other words, it is 10 mm. from point A, Fig. 3, only if index 12 has its finger 17 at point A, the lowest or neutral point.

If the bottom of the lens groove is curved, as for round lenses is usually the case, the instrument must be correctly positioned or neutralized before taking vertical measurements to insure against any vertical errors. The reason for this is as follows. The distance 10 mm. on the side scales 25 indicates the distance from that mark to the point of the feeler 17 when the feeler is at the bottom or lowest point in the lens groove which is, of course, also the lowest measuring point of the lens but as the vertical index moves right or left of this point the curvature of the groove will cause the feeler point to rise naturally changing this distance which will no longer represent 10 mm. In other words, it will no longer be 10 mm. from point of feeler to the 10 mm. mark unless the instrument feeler is returned to the lowest point in the lens groove, so the instrument is neutralized as follows.

Both indices 12 must be returned to the neutral or lowermost point in the lens groove as above stated. If index 12 is moved one way or the other along curve 20ª, shown more particularly in Fig. 4, the scales are automatically raised or lowered with respect to the neutral point. Correction or "neutralization" therefore is in order and must be made before taking vertical measurements, because the P. D. measurements do not, as a rule, coincide with the neutral point of the frame. As will be seen, index 12 has no connection with vertical measurements except to see that point 17 is at A, the neutral point of the frame and the scales are restored to their proper relation with point A, before any vertical measurements are taken. With the finger set pointers 43 to mark 0, 46, next move the vertical indices 12 right or left until their respective pointers 43 no longer show signs of motion. When these pointers 43 stop moving up or down while the vertical indices 12 are moved right and left, the feeler points 17 are at the lowest point of their respective grooves and vertical measurements may then be taken.

To determine any facial asymmetry in the vertical plane (one eye higher than the other) move the horizontal indices 13 up or down until their respective hair lines 22 either bisect each pupil or other corresponding corneal parts. Any discrepancy or difference shown on the readings of the outer scales 25 immediately shows a vertical unbalance which can be compensated for by placing the "distance" or "reading" optical center in the proper position when grinding the lenses.

To obtain the height of the bifocal segment the horizontal indices 13 are moved until the hair lines 22 are coincident with each lower lid, or other predetermined point of reference which would represent the height of the finished bifocal segment. This height of the bifocal segment is read in millimeters, for each eye, directly from the scales 25 at the outer sides of the instrument mask 10. It is to be noted that the majority of plastic frames in use are one millimeter smaller as they come from the manufacturer than the required finished lens size. Therefore in such instances one half this difference must be added, or one half millimeter to the segment heights as read from the scales 25.

It can readily be seen that the instrument provides all measurements required while attached to the spectacle frame, pupillary distance, (P. D.) pupil height and bifocal segment height, everything needed for the proper fitting and grinding of lenses and computations for the proper fitting of eyeglasses can quickly be determined and accurately transferred to lenses and frame by the use of this instrument. What takes place in effect, is that all measurements are taken and transferred to the lenses as though the lenses were actually in the frame and worn by the patient.

We claim:

1. Apparatus for ophthalmic measurements including a mask comprising a base plate having a pair of laterally spaced sight opening windows therein, means for mounting said base plate mask in front of a spectacle frame and centering the same with the windows in front of the lens openings of the frame whereby the mask is adapted for mounting on any spectacle frame regardless of the size or shape of the lens openings, and pairs of vertical and horizontal indices adjustably mounted on the mask base plate so as to extend in the area of the sight opening windows for making pupillary distance, pupil height and bifocal segment height measurements and the like directly with respect to the spectacle frame selected.

2. Apparatus for ophthalmic measurements including a mask comprising a base plate having a pair of laterally spaced sight opening windows therein, means for mounting said base plate mask in front of a spectacle frame and centering the same with the windows in front of the lens openings of the frame whereby the mask is adapted for mounting on any spectacle frame regardless of the size or shape of the lens openings, pairs of vertical and horizontal indices adjustably mounted on the mask base plate so as to extend in the area of the sight opening windows for making pupillary distance, pupil height and bifocal segment height measurements and the like directly with respect to the spectacle frame selected, scales on the mask base plate cooperating with each of the vertical and horizontal indices, and manually operable means for moving the vertical indices horizontally and the horizontal indices vertically with respect to the mask and spectacle frame lens openings.

3. Apparatus for ophthalmic measurements including a mask having sight opening windows therein, means for mounting said mask on a spectacle frame and centering the same with the windows in front of the lens openings of the frame, comprising a plurality of fingers on the back of the mask for engaging the lens grooves in the spectacle frame, and indices carried by the mask for making ophthalmic measurements of a patient's eyes directly in line with the spectacle frame and through said sight opening windows.

4. Apparatus for ophthalmic measurements including a mask having sight opening windows therein, means for mounting said mask on a spectacle frame and centering the same with the windows in front of the lens openings of the frame, comprising a plurality of fingers on the back of the mask for engaging the lens grooves in the spectacle frame; said fingers for each lens opening including an upper spring pressed vertically movable finger engageable with the groove in the upper part of the lens opening, a lower laterally adjustable finger engageable with the lower portion of the lens groove, and a spring pressed laterally movable finger engageable with the inner side portion of the lens groove.

5. Apparatus for ophthalmic measurements including a mask having sight opening windows therein, means for mounting said mask on a spectacle frame and centering the same with the windows in front of the lens openings of the frame, comprising a plurality of fingers on the back of the mask for engaging the lens grooves in the spectacle frame, said fingers for each lens opening including an upper spring pressed vertically movable finger engageable with the groove in the upper part of the lens opening, a lower laterally adjustable finger engageable with the lower portion of the lens groove, and a spring pressed laterally movable finger engageable with the inner side portion of the lens groove, the last said fingers cooperating as a pair to center the spectacle frame with respect to the mask, and a manually operable plunger cooperating with said fingers for moving them outwardly to a releasing position.

6. Apparatus for ophthalmic measurements including a mask having sight opening windows therein, means for mounting said mask on a spectacle frame and centering the same with the windows in front of the lens openings of the frame, comprising a plurality of fingers on the back of the mask for engaging the lens grooves in the spectacle frame, said fingers for each lens opening including an upper spring pressed vertically movable finger engageable with the groove in the upper part of the lens opening, a lower laterally adjustable finger engageable with the lower portion of the lens groove, a vertical index carried by each of said laterally adjustable fingers for making pupillary distance measurements, and a spring pressed laterally moveable finger engageable with the inner side portion of the lens groove.

7. Apparatus for ophthalmic measurements including a mask having sight opening windows therein, means for mounting said mask on a spectacle frame and centering the same with the windows in front of the lens openings of the frame, comprising a plurality of fingers on the back of the mask for engaging the lens grooves in the spectacle frame, said fingers for each lens opening including an upper spring pressed vertically movable finger engageable with the groove in the upper part of the lens opening, a lower laterally adjustbale finger engageable with the lower portion of the lens groove, an adjusting screw cooperating with each of said laterally adjustable fingers for making lateral adjustments thereof for correctly positioning the mask with respect to the spectacle frame, and a spring pressed laterally movable finger engageable with the inner side portion of the lens groove.

8. Apparatus for ophthalmic measurements including a mask having sight opening windows therein, means for mounting said mask on spectacle frames and centering the same with the windows in front of the lens openings of the frame, comprising a plurality of fingers on the back of the mask for engaging the lens grooves in the spectacle frame, said fingers for each lens opening including an upper spring pressed vertically movable finger engageable with the groove in the upper part of the lens opening, a lower laterally adjustable finger engageable with the lower portion of the lens groove, a vertical index carried by each of said laterally adjustable fingers, an adjusting screw cooperating with each of said laterally adjustable fingers for making lateral adjustments thereof for correctly positioning the mask with respect to the spectacle frame, and for adjusting the vertical index laterally for making pupillary distance measurements, and a spring pressed laterally movable finger engageable with the inner side portion of the lens groove.

9. Apparatus for ophthalmic measurements including a mask having sight opening windows therein, means for mounting said mask on spectacle frames and centering the same with the windows in front of the lens openings of the frame, comprising a plurality of fingers on the back of the mask for engaging the lens grooves in the spectacle frame, said fingers for each lens opening including an upper spring pressed vertically movable finger engageable with the groove in the upper part of the lens opening, a lower laterally adjustable finger engageable with the lower portion of the lens groove, a vertical index carried by each of said laterally adjustable fingers, an adjusting screw cooperating with each of said laterally adjustable fingers for making lateral adjustments thereof for correctly positioning the mask with respect to the spectacle frame, and for adjusting the vertical index laterally for making pupillary distance measurements, and a spring pressed laterally movable finger engageable with the inner side portion of the lens groove, the last said fingers cooperating as a pair to center the spectacle frame with respect to the mask, and a manually operable plunger cooperating with said fingers for moving them outwardly to a releasing position.

10. Apparatus for ophthalmic measurements including a mask having sight opening windows therein, means for mounting said mask on spectacle frames and centering the same with the windows in front of the lens openings of the frame, comprising a plurality of fingers on the back of the mask for engaging the lens grooves in the spectacle frame, said fingers for each lens opening including an upper spring pressed vertically movable finger engageable with the groove in the upper part of the lens opening, a lower laterally adjustable finger engageable with the lower portion of the lens groove, a vertical index carried by each of said laterally adjustable fingers, an adjusting screw cooperating with each of said laterally adjustable fingers for making lateral adjustments thereof for correctly positioning the mask with respect to the spectacle frame, and for adjusting the vertical index laterally for making pupillary distance measurements, and a spring pressed laterally movable finger engageable with the inner side portion of the lens groove, the last said fingers cooperating as a pair to center the spectacle frame with respect to the mask, a manually operable plunger cooperating with said fingers for moving them outwardly to a releasing position, a vertically adjustable horizontal index cooperating with each of the window openings, an adjusting screw cooperating with each of said horizontal indices for independently moving them to various vertically adjusted positions, and scales on the mask with which the vertical and horizontal indices cooperate whereby ophthalmic measurements may be directly indicated.

11. Apparatus for ophthalmic measurements including a mask having sight opening windows therein, means for mounting said mask on a spectacle frame and centering the same with the windows in front of the lens openings of the frame, comprising a plurality of fingers on the back of the mask for engaging the lens grooves in the spectacle frame, said fingers for each lens opening including an upper spring pressed vertically movable finger engageable with the groove in the upper part of the lens opening, swingable pointers frictionally carried by said vertically movable fingers for indicating any vertical movement of the spectacle frame with respect to the mask, a lower laterally adjustable finger engageable with the lower portion of the lens groove, an adjusting screw cooperating with each of said laterally adjustable fingers for making lateral adjustments thereof for correctly positioning the mask with respect to the spectacle frame, and a spring pressed laterally movable finger engageable with the inner side portion of the lens groove.

12. Apparatus for ophthalmic measurements including a mask having sight opening windows therein, means for mounting said mask on a spectacle frame and centering the same with the windows in front of the lens openings of the frame, comprising a plurality of fingers on the back of the mask for engaging the lens grooves in the spectacle frame, said fingers for each lens opening including an upper spring pressed vertically movable finger engageable with the groove in the upper part of the lens opening, a lower laterally adjustable finger engageable with the lower portion of the lens groove, and a spring pressed laterally movable finger engageable with the inner side portion of the lens groove, the last said fingers cooperating as a pair to center the spectacle frame with respect to the mask, a manually operable plunger cooperating with said fingers for moving them outwardly to a releasing position, and a finger grip on the mask adjacent to said manually operable plunger to facilitate in the operation thereof in positioning the mask on a spectacle frame.

13. Apparatus for ophthalmic measurements including a mask having sight opening windows therein, means for mounting said mask on a spectacle frame and centering the same with the windows in front of the lens openings of the frame, comprising a plurality of fingers on the back of the mask for engaging the lens grooves in the spectacle frame, said fingers for each lens opening including an upper spring pressed vertically movable finger engageable with the groove in the upper part of the lens opening, a lower laterally adjustable finger engageable with the lower portion of the lens groove, and a spring pressed laterally movable finger engageable with the inner side portion of the lens groove, means for adjusting said lower laterally adjustable fingers for making neutralizing adjustments of the mask with respect to the spectacle frame, a vertically adjustable horizontal index cooperating with each of the window openings, and operating means therefor.

14. Apparatus for ophthalmic measurements including a mask having sight opening windows therein, means for mounting said mask on a spectacle frame and centering the same with the windows in front of the lens openings of the frame, comprising a plurality of fingers on the back of the mask for engaging the lens grooves in the spectacle frame, said fingers for each lens opening including an upper spring pressed vertically movable finger engageable with the groove in the upper part of the lens opening, a lower laterally adjustable finger engageable with the lower portion of the lens groove, an adjusting screw cooperating with each of said laterally adjustable fingers for making lateral adjustments thereof for correctly positioning the mask with respect to the spectacle frame, a spring pressed laterally movable finger engageable with the inner side portion of the lens groove, a vertically adjustable horizontal index cooperating with each of the window openings, and an adjusting screw cooperating with each of said horizontal indices for independently moving them to various vertically adjusted positions.

15. The method of making ophthalmic measurements which consists in mounting a mask with sight openings therein and carrying vertical and horizontal indices in line with the sight openings in front of a spectacle frame and manipulating the vertical indices for pupillary distance, adjusting the mask on the frame with respect to the lowermost position of the lens groove, and manipulating the horizontal indices for pupillary elevation measurements, whereby the ophthalmic measurements are all made with respect to the lens groove in the spectacle frame.

FERDINAND G. HENRY.
GEORGE W. STARK.

REFERENCES CITED

The following references are of record in the file of this patent:

UNITED STATES PATENTS

| Number | Name | Date |
|---|---|---|
| 1,200,862 | May | Oct. 10, 1916 |
| 1,505,447 | Uhlemann | Aug. 19, 1924 |
| 1,542,019 | Whitaker et al. | June 16, 1925 |
| 1,935,175 | Clement | Nov. 14, 1933 |

Certificate of Correction

Patent No. 2,491,312 December 13, 1949

FERDINAND G. HENRY ET AL.

It is hereby certified that errors appear in the printed specification of the above numbered patent requiring correction as follows:

Column 3, line 35, for the word "distance" read *distances*; column 6, line 57, for "reely" read *freely*; line 58, for the numeral "7" read *17*; and that the said Letters Patent should be read with these corrections therein that the same may conform to the record of the case in the Patent Office.

Signed and sealed this 9th day of May, A. D. 1950.

[SEAL]

THOMAS F. MURPHY,
*Assistant Commissioner of Patents.*